United States Patent
Fragoso Iniguez et al.

(10) Patent No.: US 9,862,317 B2
(45) Date of Patent: Jan. 9, 2018

(54) AUTOMATED DEFROST AND DEFOG PERFORMANCE TEST SYSTEM AND METHOD

(71) Applicant: FORD GLOBAL TECHNOLOGIES, LLC, Dearborn, MI (US)

(72) Inventors: Marcos Ahuizotl Fragoso Iniguez, Neza (MX); Kevin M. Rolinski, White Lake, MI (US); Rachid E. El Aile, Troy, MI (US); Oscar Monroy, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 238 days.

(21) Appl. No.: 14/739,689

(22) Filed: Jun. 15, 2015

(65) Prior Publication Data

US 2016/0362049 A1    Dec. 15, 2016

(51) Int. Cl.
  *B60J 1/00*    (2006.01)
  *B60R 1/00*    (2006.01)
  (Continued)

(52) U.S. Cl.
  CPC ............... *B60R 1/00* (2013.01); *B60J 1/002* (2013.01); *B60S 1/023* (2013.01); *G06T 7/0004* (2013.01);
  (Continued)

(58) Field of Classification Search
  CPC ...... B60R 1/00; B60R 1/001; G06Q 10/06311
  (Continued)

(56) References Cited

U.S. PATENT DOCUMENTS 5,137,213 A * 8/1992 Yamamoto ......... B60H 1/00842
                                                     165/204
5,873,256 A * 2/1999 Denniston .......... B60H 1/00414
                                                      62/244
(Continued)

FOREIGN PATENT DOCUMENTS

DE    102005046512 A1    4/2007
DE    102004047885 A1    11/2007
(Continued)

OTHER PUBLICATIONS

English machine translation for DE102005046512.
(Continued)

*Primary Examiner* — Christopher S Kelley
*Assistant Examiner* — Asmamaw G Tarko
(74) *Attorney, Agent, or Firm* — Vichit Chea; King & Schickli PLLC

(57) ABSTRACT

A system for evaluating performance of a vehicle window defrosting/defogging apparatus includes at least one computing device having at least a processor and a memory, and one or more imagers configured for obtaining images of one or more windows of a vehicle. The processor is configured to execute instructions for analyzing the images to determine a defrosted/defogged portion of the one or more windows at predetermined time intervals, including controlling illumination to optimize the system's ability to distinguish cleared window areas. A graphical user interface is configured for displaying and/or manipulating at least one of the one or more images, digital data of the one or more images, and a predetermined template for determining the defrosted/defogged portion of the one or more windows. The system includes instructions for aligning the one or more images with the predetermined template, including processing the images to correct for window taper, curvature, and size.

16 Claims, 4 Drawing Sheets

(51) Int. Cl.
*G06T 7/00* (2017.01)
*G07C 5/08* (2006.01)
*H04N 7/18* (2006.01)
*G06T 7/30* (2017.01)
*B60S 1/02* (2006.01)
*G06T 7/33* (2017.01)

(52) U.S. Cl.
CPC .................. *G06T 7/30* (2017.01); *G06T 7/33* (2017.01); *G07C 5/0808* (2013.01); *H04N 7/183* (2013.01); *B60R 2300/8053* (2013.01); *G06T 2207/10016* (2013.01); *G06T 2207/30268* (2013.01)

(58) Field of Classification Search
USPC .................................................. 348/148, 122
See application file for complete search history.

(56) References Cited

U.S. PATENT DOCUMENTS

| | | | | |
|---|---|---|---|---|
| 8,400,502 | B2* | 3/2013 | Zakrzewski | B64D 45/0015 348/122 |
| 9,520,006 | B1* | 12/2016 | Sankovsky | G07C 5/006 |
| 2005/0228689 | A1* | 10/2005 | Hagood | G06Q 10/10 283/94 |
| 2007/0115357 | A1* | 5/2007 | Stein | B60Q 1/0023 348/148 |
| 2009/0093927 | A1* | 4/2009 | Mueller-Schneiders | B60R 16/0232 701/36 |
| 2010/0268412 | A1* | 10/2010 | Mori | B60W 10/30 701/31.4 |
| 2012/0037336 | A1* | 2/2012 | Ishikawa | B60H 1/00314 165/51 |
| 2013/0145460 | A1* | 6/2013 | Dudley | F25D 29/003 726/21 |
| 2013/0208120 | A1* | 8/2013 | Hirai | H04N 7/18 348/148 |
| 2015/0227300 | A1* | 8/2015 | Nagara | B60H 1/0065 701/49 |
| 2016/0075211 | A1* | 3/2016 | Kim | B60H 1/00785 62/80 |

FOREIGN PATENT DOCUMENTS

| | | |
|---|---|---|
| JP | 2005145249 A | 6/2005 |
| JP | 2014025878 A | 2/2014 |
| KR | 100254814 B1 | 6/2000 |
| KR | 100306607 B1 | 8/2001 |

OTHER PUBLICATIONS

English machine translation for JP2014025878.
English machine translation for JP2005145249.
English machine translation for KR100254814.
English machine translation for KR100306607.
English machine translation for 102004047885.
SAE International, J381, Standards, SAE.org, Windshield Defrosting Systems Test Procedure and Performance Requirements—Trucks, Buses, and Multipurpose Vehicles, Mar. 11, 2008.

* cited by examiner $H = R * \cos(\operatorname{atan}(b/R))$ $NW = 2*b*\tan(\phi)*N$

AUTOMATED DEFROST AND DEFOG PERFORMANCE TEST SYSTEM AND METHOD

TECHNICAL FIELD

This document relates generally to the motor vehicle field and, more particularly, to systems and methods for objectively evaluating vehicle window defroster performance.

BACKGROUND

To evaluate window defrosting performance, certain standard operating procedures have been developed for vehicles of any power plant type, including gas, diesel, electric/hybrid (HEV, PHEV, BEV) and others. For example, one procedure followed by the automotive industry establishes a uniform test procedure and performance requirements for vehicle window defrosting systems that can be conducted on uniform test equipment in commercially available laboratory facilities, for example for buses [Society of Automotive Engineers (SAE) Surface Vehicle Recommended Practice, SAE J381, SAE International, Warrendale Pa., 2000) and for automobiles (SAE J902), with other comparable standards for vehicle window defrosting and defogging established worldwide, see for example FMVSS103 (North America), ADR42/04 (Australia), GB 11555-2009 (China), and ECE 672/2010 (Europe), the contents of each of which are incorporated in their entirety by reference herein as if fully reproduced. Such testing is necessary for comparing alternative defroster systems during the automotive design process, and/or for comparing defroster performance of a vehicle/engine configuration to an established standard.

Further, uniform testing protocols such as SAE J381 and J902 provide for established minimum standards for window defrosting/demisting within a predetermined time period. To assist in making these evaluations, predetermined templates representing areas of a window such as a windshield that must be fully or partially defrosted over the predetermined time period have been defined. These templates are often a part of the regulatory requirements established by government agencies, and define specific vehicle occupant vision zones of a window that are required to be defrosted within a specific time period after the vehicle engine and defrost system are started.

At a high level, the uniform test procedure requires a vehicle soaking step (for example, 10 hours at −18° C. for defrosting, −5° C. for defogging). In the case of defrosting, this is followed by an additional application of a predetermined amount of water to create a substantially uniform coating of frost/ice on the vehicle windows. Next, a predetermined air flow is initiated such as in a wind tunnel, and the vehicle engine and defrost system are started to begin defrosting of the window glass. In one part of the conventional test procedure, human intervention is required, that is, traces are taken by outlining ice areas of a window using a wax pencil or the equivalent at predetermined intervals over a predetermined time period (or until the window is determined to be clear of frost/ice), and once the test is completed those traces are transferred to paper by tracing, reduced, and analyzed by a known computer program product (for example, MATLAB; Mathworks, Natick, Mass.) in order to measure/calculate the defrosting/defogging area.

The steps of tracing and transferring prior to calculation introduce significant potential for human error due to the operator subjectivity required to transfer a trace and convert it into a usable format. Moreover, the vehicle must be transferred to a warm area in order to allow transfer of the trace to paper. This reduces the number of tests that can be performed consecutively. Also, paper used to transfer a windshield trace must be quite large to match typical windshield dimensions. For this reason it is often the case that traces that have been transferred to paper must be analyzed/measured outside of the laboratory facilities, since most testing facilities do not have an image reducer that can handle paper of the required dimensions for a vehicle window tracing.

It is also known to utilize digital cameras to record window defrosting performance (SAE J381, 2000). Images taken by each camera are downloaded to a computing device equipped with suitable software according to the particular cameras used. Then, the images are printed and an ice area is calculated for each image, such as by a planimeter. Again, the steps of calculating ice areas on images, such as for windows having different defrost states including areas of white ice, gray ice, wet ice, an edge of wet ice, and a fully defrosted area, allow for the introduction of human error in the process. In turn, simply analyzing printed images for ice areas does not account for certain factors that may influence the test results, such as errors/artifacts introduced during the photographic processes due to window curvature, size reduction, etc., and so may introduce further error into the results obtained by the testing process.

To address these and other issues, the present disclosure describes a system and method for monitoring and evaluating performance of a vehicle window defroster and defogger. Advantageously, the system and method provide automatic comparison of defrosting performance against a predetermined template which can represent regulatory standards for window defrosting and defogging, including accounting for irregularities in window shape and size during the process of image acquisition/analysis. The system and method further include automatic monitoring/optimizing of lighting to maximize efficiency of monitoring/analyzing window defrosting performance.

SUMMARY

In accordance with the purposes and benefits described herein, a system for evaluating performance of a vehicle window defrosting/defogging apparatus includes at least one computing device comprising a processor and a memory and one or more imagers operatively connected to the computing device and configured for obtaining one or more images of one or more windows of a vehicle. This can include stills and video, and the analysis can be real-time, near real-time, or otherwise. The processor is configured to execute non-transitory computer-executable instructions for analyzing the one or more images to determine a defrosted portion of the one or more windows at predetermined time intervals. The processor is further configured to execute non-transitory computer-executable instructions for controlling a level of illumination within at least a field of view of the one or more imagers.

In embodiments, the system further includes a graphical user interface operatively connected to the computing device and configured for displaying and/or manipulating at least one of the one or more images, digital data of the one or more images, and a predetermined template for determining the defrosted portion of the one or more windows. The template represents specific regulatory agency metrics for evaluating performance of a vehicle defrosting apparatus, i.e. a specific percentage of a window to be fully or at least partially defrosted within a predetermined time period. The processor is further configured to execute non-transitory computer-executable instructions for aligning the one or more images with the predetermined template. In embodiments, this step of aligning includes instructions for processing to adjust a taper, a curvature, and a height and/or width of the one or more images according to the predetermined template, i.e. to properly align and fit the processed image to the template.

In another aspect, methods for evaluating performance of a vehicle window defrosting and defogging apparatus are described.

In the following description, there are shown and described several preferred embodiments of the disclosed system and method for monitoring and evaluating performance of a vehicle window defroster. As it should be realized, the system and method are capable of other, different embodiments and their several details are capable of modification in various, obvious aspects all without departing from the descriptions set forth herein and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the system and method for monitoring and evaluating performance of a vehicle window defroster and together with the description serve to explain certain principles thereof. In the drawing figures.

Reference will now be made in detail to the present preferred embodiments of the described system and method for evaluating defroster performance, examples of which are illustrated in the accompanying drawing figures.

DETAILED DESCRIPTION

Figure 1:
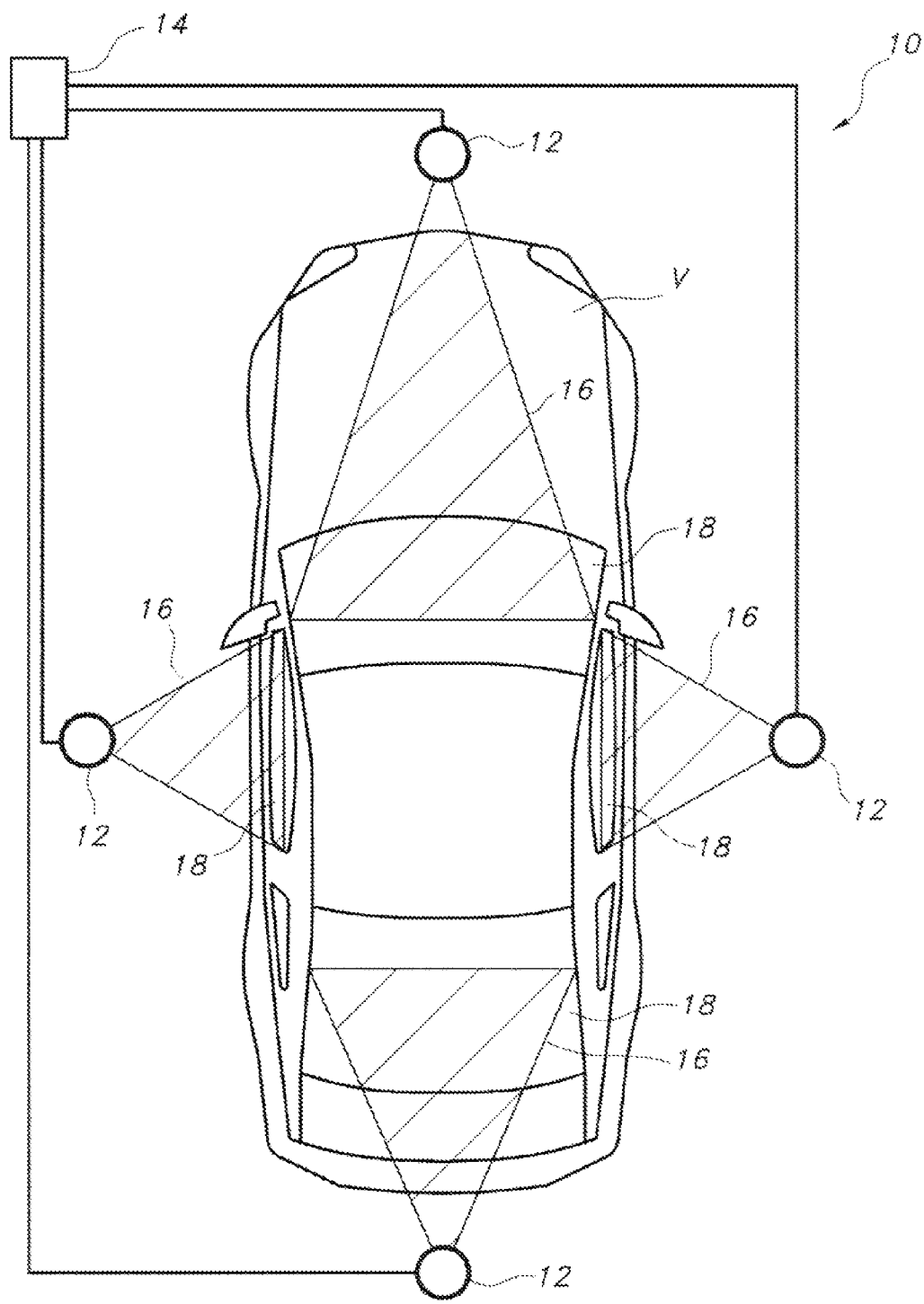
FIG. 1 is a schematic block diagram of a system for monitoring and evaluating performance of a window defroster arrayed about a vehicle.

Reference is now made to FIG. 1 which depicts a system 10 for evaluating performance of a window defrosting system of a vehicle V. Preliminarily, while for convenience the systems and methods are described in the context of evaluating defrosting of a vehicle V front windshield, it will be appreciated that the described systems/methods apply equally to evaluation of defrosting of any vehicle window V as shown in FIG. 1. Likewise, while the systems and methods are described in the context of evaluating performance of a heating blower-based defrosting apparatus, it will be appreciated that the described systems/methods apply equally to alternative defrosting/deicing systems, for example heating wires or coils embedded in a window glass and the like.

The system includes one or more imagers 12 operatively connected to a computing device 14 including at least a processor and a memory. As shown in FIG. 1, each of the imagers 12 is disposed whereby a field of vision 16 thereof encompasses at least a portion of a window 18 of the vehicle V, to allow monitoring of defrosting performance. In an embodiment, the imagers 12 are configured to automatically transmit digital data of images of one or more windows 18 to computing device 14 for processing at predetermined time intervals over a predetermined time period as will be discussed below. Of course, in an alternative embodiment the computing device 14 processor could be configured to automatically fetch image data from the one or more imagers 12 at predetermined time intervals over a predetermined time period.

Figure 2:
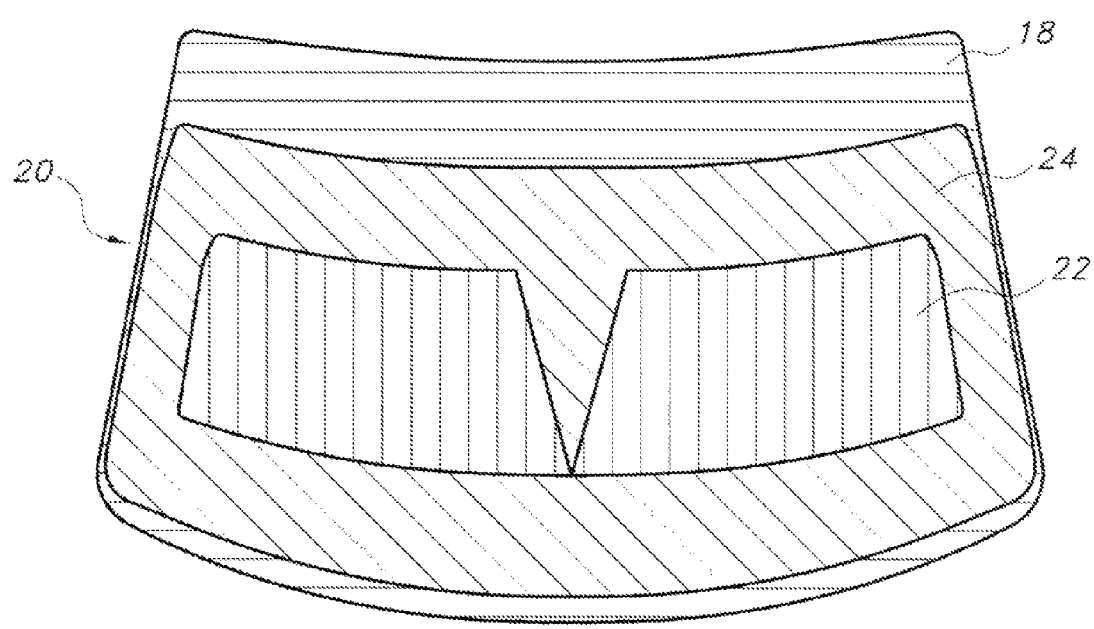
FIG. 2 depicts a predetermined template for evaluating performance of the system of FIG. 1.

As summarized above, government agencies often define predetermined templates identifying areas of a window such as a windshield that must be fully defrosted during a predetermined time period of operation of the vehicle defrost system. A representative template 20 is shown in FIG. 2, being an RGB (red-green-blue) pattern showing the entire windshield 18 and also defining two specific areas 22, 24 of the windshield that are required to be fully or partially defrosted during a predetermined time period of operation of the vehicle defrost system. As will be described below, those areas, overlaid over a windshield image processed according to the present disclosure, allow analysis and quantification of an amount of defrosting/defogging occurring in each area during the predetermined time.

Figure 3:
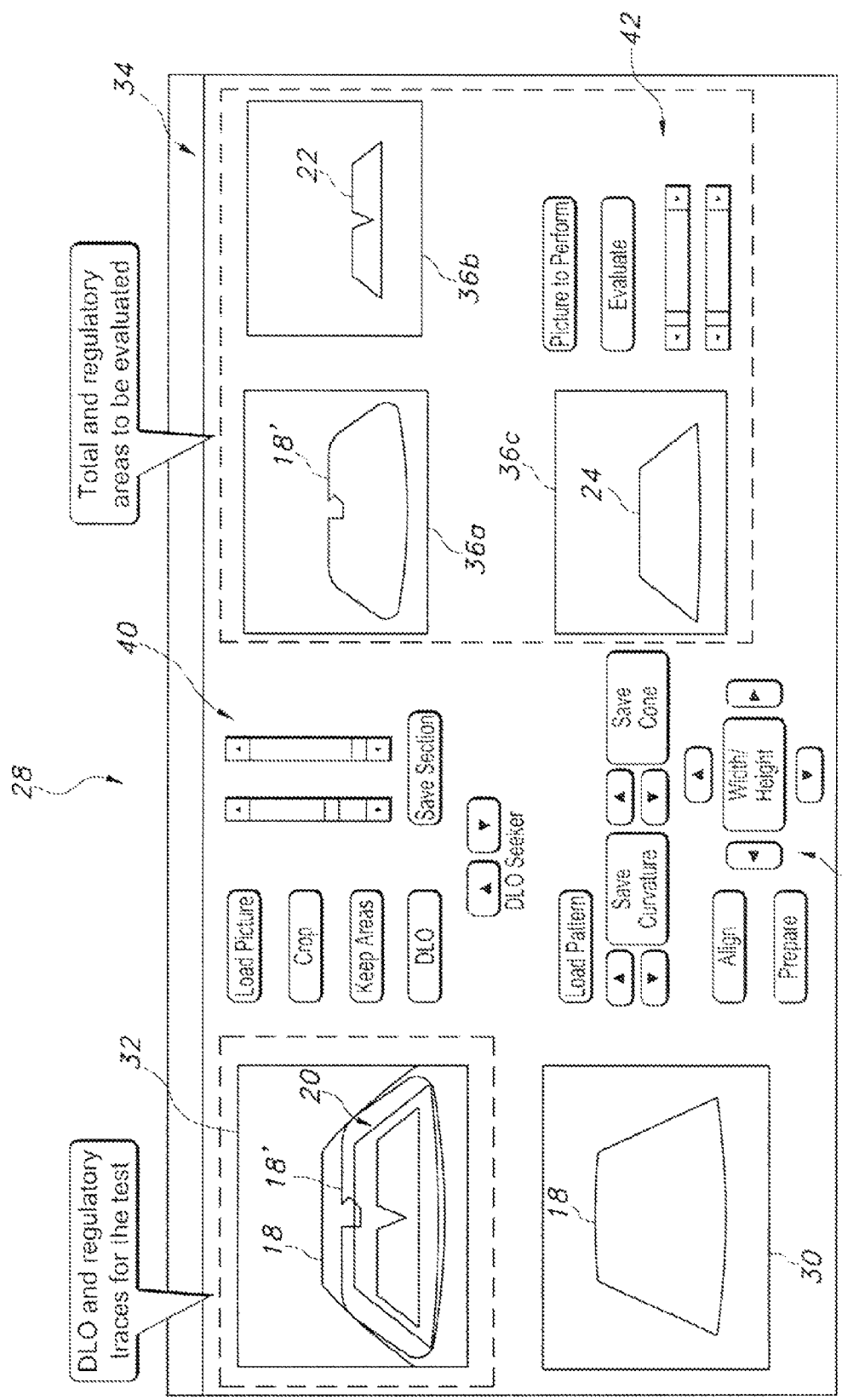
FIG. 3 depicts an exemplary graphical user interface for use with the system of FIG. 1.

A representative graphic user interface (GUI) 28 for analysis of window images is depicted in FIG. 3. Of course, it will be appreciated that the specific layout of the GUI 28 is merely one embodiment of a GUI, and that any number of alternative configurations/layouts are contemplated as necessitated or desired by the user. As shown, the GUI 28 includes a first image area 30 wherein is displayed an image taken of a windshield 18 and including controls for processing the image. A second image area 32 displays the image of the windshield 18, processed as will be described infra to account for irregularities in the windshield 18 shape to provide a processed windshield image 18', and overlaid with the template 20. A third image area 34 includes individual image areas 36a, 36b, 36c wherein processed windshield image 18' and individual portions 22, 24 of template 20 can be separately displayed and analyzed.

An instrumentation panel 38 associated with image area 30 provides specific controls for processing images taken by imagers 12. In the depicted embodiment, instrumentation panel 38 includes controls for loading a template 20 (Load Pattern), for aligning an imager 12 field of view to a window 18 as desired (Align), for adjusting and saving a width and height (Width/Height) of windshield image 18, and for adjusting and saving a curvature (Save Curvature) and a taper (Save Cone) of an image to correct for a corresponding curvature/taper of the windshield 18 of which the image was taken.

Likewise, an instrumentation panel 40 associated with image area 32 provides specific controls for loading a processed image (Load Picture) including an overlaid template 20 as shown, and for removing unwanted portions of an image (Crop) and for saving wanted portions (Keep Areas). The panel 40 also includes controls for initiating and controlling a day light opening (DLO, DLO Seeker) to control a level of illumination of at least a portion of a vehicle window 18 disposed within a field of view 16 of a camera 12. As will be appreciated, this feature allows real-time control of a level of illumination in a portion of a test chamber (not shown) in which vehicle V is positioned, to ensure that images of the best quality are taken for analysis during the test procedure, thus maximizing the accuracy of distinguishing different stages of defrosting of portions of a window 18 (white ice, gray ice, wet ice, an edge of wet ice, fully cleared/defrosted) within the areas 22, 24 of template 20.

Similarly, an instrumentation panel 24 associated with image area 34 allows separate analysis/manipulation of processed windshield image 18', of area 22 of template 20, and of area 24 of template 20 to determine a percentage of the respective image defrosted in a particular image.

Figure 4:
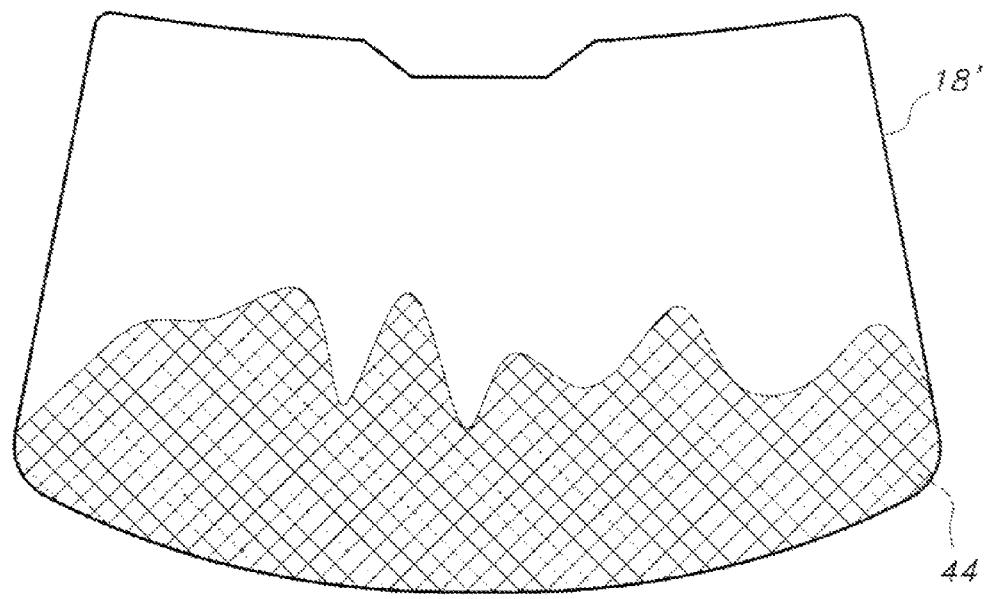
FIG. 4 illustrates an image of a vehicle windshield taken and processed by the system of FIG. 1, with dark areas showing portions of the windshield that have been defrosted and white areas showing portions of the windshield requiring defrosting.

In the depicted embodiment, a conventional MATLAB computer program product (Mathworks, Natick Mass.) is used, provided with particular algorithms designed for analysis of digital data of taken window images to determine defrosting performance. White pixels are interpreted as areas still coated with ice/frost and requiring defrosting, whereas gray pixels are interpreted as defrosted/cleared areas (see, representatively, FIG. 4 showing a windshield image 18' that was approximately 48% defrosted after 10 minutes of operation of the vehicle V defrost system as shown by gray area 44). Of course, other computer program products exist or can be modified for image analysis as described above, and are contemplated for use herein.

In use, a vehicle V is prepared substantially as described above and according to uniform testing protocols, such as by a predetermined vehicle V soak time, application of a predetermined quantity of water to create a substantially uniform coating of ice on a window 18 such as a windshield, etc. Next, the imagers 12 (in the depicted embodiments being digital cameras) are initiated and recognized by computing device 14, i.e. specific digital camera addresses are ascertained by the computing device 14 to allow identification of a specific window 18 being analyzed.

Next, a DLO (Day Light Opening) and windows recognition process is begun wherein all lighting in the test chamber is extinguished, and the vehicle V internal passenger cabin lights are activated. In this step, the imager 12 begins acquiring images of a window 18, and the imager field of vision 16 is aligned (see "Align" button on instrument panel 38 of FIG. 3) to match the edges of the window 18 being analyzed. The aligned imager 12 then begins acquiring images (see image area 30 of FIG. 3).

The images (image area 30) acquired in the previous step are then processed to account for irregularities in conformation of window 18 and to overlay template 20. As will be appreciated by the skilled artisan, images acquired by an imager such as a digital camera are wrapped, but the template 20 to be used is not. Therefore, some processing of the image is necessary to fit the images to the template 20. In the depicted embodiment, the acquired images of window 18 are processed to correct for window 18 conic deformation, curvature deformation, and size deformation to allow accurate placement of template 20. As will be appreciated, these corrections will be applied to all subsequent images taken of window 18 during the defrost performance test.

Figure 5A:
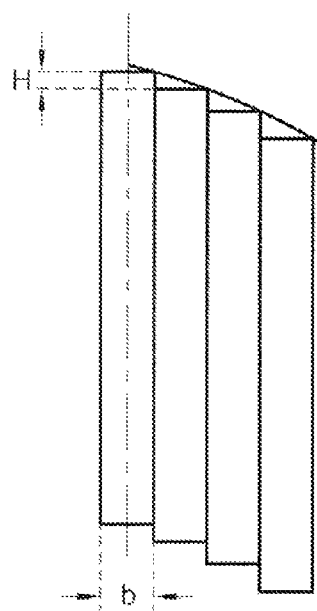
FIG. 5A shows a representative analysis and algorithm for processing an image to correct for a window taper.

With reference to FIG. 5A, as is known a window 18 such as a windshield is curved rather than flat, to reduce wind resistance. Therefore, it is necessary to account for windshield curvature. To account for windshield curvature, the image of windshield 18 is deformed by taking horizontal slices from base of the image, and repositioning the slices to preserve a desired curvature radius of the image. In an embodiment, the windshield curvature is corrected in the image according to a deformation formula $H=R*\cos(a\tan(b/R))$ wherein H=a new height position of a slice, b=a width of a slice, and R=a desired radius of the slices which is required to correct for windshield curvature.

Figure 5B:
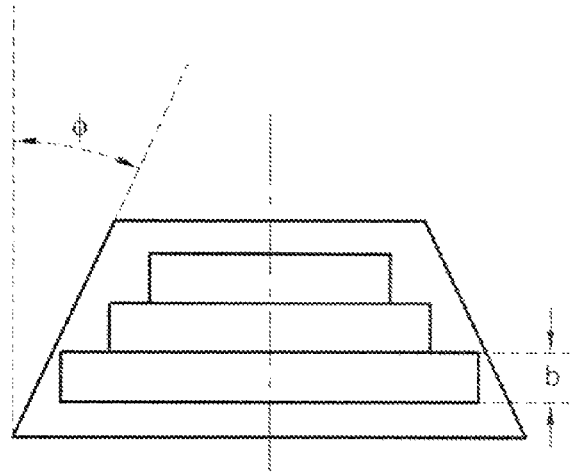
FIG. 5B shows a representative analysis and algorithm for processing to an image to correct for an image curvature.

Additionally, a typical window such as a windshield is similar in conformation to a cone. Therefore, correcting for windshield curvature does not suffice to align the images to the template 20. To account for this conic deformation/taper, the image of window 18 is further deformed by taking vertical slices along a height of the image and repositioning them (see FIG. 5B). Those vertical slices are used as image vectors to correct for the windshield taper. In an embodiment, the windshield taper is corrected in the image according to a deformation formula $NW=2*b*\tan(\varphi)*N$, wherein NW=a new slice width, b=slice height, N=a number of slices taken, and $\varphi$=a taper angle.

Still more, different windows 18 from different makes/models of vehicles V are typically not standardized in size. Therefore, the described process further includes altering a height/width of the image of window 18 (see Width/Height in instrument panel 38 of FIG. 3) to fit the image to the regulatory template 20.

Next, the processed image is displayed in image area 32 as processed window image 18', and overlaid with template 20 (see FIG. 3). By GUI 28, illumination at least in the imager fields of view 16 is adjusted to provide an optimal balance of brightness/color for accurate evaluation of defrosting performance as measured by defrosted/cleared areas of the image.

Finally, once the system has been initiated and calibrated as described above, the actual defrosting test is initiated by starting the vehicle V engine and defrosting system. Because the imagers 12 are already acquiring data, the specific time of initiating the defrost test is marked, and images are acquired of the window 18 being evaluated at predetermined time intervals over a predetermined time period. As a non-limiting example, certain governmental regulations require a specific percentage of a window 18 to be defrosted within a 40 minute time period, although any desired time period is contemplated. Thus, in the depicted embodiment the test is run over that 40 minute time period. Images can be sent to the computing device 14 at any desired time interval, for example 5 minute intervals, at 15, 25, and 40 minutes, continuously over the 40 minute time frame as quickly as the imager 12 can acquire the images, etc. Those images are output to image area 34 for separate analysis of portions of the regulatory template 20 as shown. As yet other alternatives, the test may be continued until breakthrough (i.e., until a first portion of window 18 is cleared), until all areas of window 18 are cleared, or for longer or shorter periods of time.

Thus, by the foregoing description a simple, efficient, and robust system and method for measuring defrost system performance is provided. The system and method are automated, calculate real-time defrosting performance, and eliminate prior art procedures such as physical traces of windows 18 to ascertain percentage of defrosting, thus reducing the potential for human error. Further, the described system and method automatically apply government/regulatory agency metrics of defrosting performance (template 20), again reducing the potential introduction of human error in applying the regulatory standards. Still further, while potentially only a portion of images acquired by imagers 12 are actually saved/processed as described above, the system and method provide for continual monitoring during the entire test time period, allowing optimization of the system and method on an ongoing basis.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A system for evaluating performance of a vehicle window defrosting/defogging apparatus, comprising:
   at least one computing device comprising a processor and a memory; and
   one or more imagers operatively connected to the computing device and configured for obtaining one or more images of one or more windows of a vehicle;
   wherein the processor is configured to execute non-transitory computer-executable instructions for analyzing the one or more images to determine a defrosted/defogged portion of the one or more windows at predetermined time intervals, for controlling a level of illumination within at least a field of view of the one or more imagers, and for aligning the one or more images with a predetermined template.

2. The system of claim 1, further including a graphical user interface operatively connected to the computing device and configured for displaying and/or manipulating at least one of the one or more images, digital data of the one or more images, and the predetermined template for determining the defrosted/defogged portion of the one or more windows.

3. The system of claim 1, wherein the processor is further configured to execute non-transitory computer-executable instructions for processing to adjust a taper of the one or more images according to the predetermined template.

4. The system of claim 1, wherein the processor is further configured to execute non-transitory computer-executable instructions for processing to adjust a curvature of the one or more images according to the predetermined template.

5. The system of claim 1, wherein the processor is further configured to execute non-transitory computer-executable instructions for processing to adjust a height dimension and/or a width dimension of the one or more images according to the predetermined template.

6. A vehicle including the system of claim 1.

7. A method for evaluating performance of a vehicle window defrosting/defogging apparatus, comprising:
   by a defrosting/defogging apparatus of a vehicle, initiating a window defrosting cycle;
   by one or more imagers, obtaining one or more images of one or more windows of a vehicle;
   transmitting the one or more images to a computing device comprising at least a processor and a memory; and
   by the processor, executing non-transitory computer-executable instructions for analyzing the one or more images to determine a defrosted/defogged portion of the one or more windows at predetermined time intervals, for controlling a level of illumination within at least a field of view of the one or more imagers, and for aligning the one or more images with a predetermined template.

8. The method of claim 7, further including, by a graphical user interface operatively connected to the computing device, displaying and/or manipulating at least one of the one or more images, digital data of the one or more images, and the predetermined template for determining the defrosted/defogged portion of the one or more windows.

9. The method of claim 7, further including, by the processor, executing non-transitory computer-executable instructions for illuminating a passenger cabin of the vehicle to control the level of illumination within at least a field of view of the one or more imagers.

10. The method of claim 7, further including, by the processor, executing non-transitory computer-executable instructions for processing to adjust a taper of the one or more images according to the predetermined template.

11. The method of claim 7, further including, by the processor, executing non-transitory computer-executable instructions for processing to adjust a curvature of the one or more images according to the predetermined template.

12. The method of claim 7, further including, by the processor, executing non-transitory computer-executable instructions for processing to adjust a height dimension and/or a width dimension of the one or more images according to the predetermined template.

13. A system for evaluating performance of a vehicle window defrosting/defogging apparatus, comprising:
   at least one computing device comprising a processor and a memory;
   one or more imagers operatively connected to the computing device and configured for obtaining one or more images of one or more windows of a vehicle; and
   a graphical user interface operatively connected to the computing device and configured for displaying and/or manipulating at least one of the one or more images, digital data of the one or more images, and a predetermined template for determining the defrosted/defogged portion of the one or more windows;
   wherein the processor is configured to execute non-transitory computer-executable instructions for analyzing the one or more images to determine a defrosted/defogged portion of the one or more windows at predetermined time intervals, for controlling a level of illumination within at least a field of view of the one or more imagers, and for aligning the one or more images with the predetermined template.

14. The system of claim 13, wherein the processor is further configured to execute non-transitory computer-executable instructions for processing to adjust a taper of the one or more images according to the predetermined template.

15. The system of claim 13, wherein the processor is further configured to execute non-transitory computer-executable instructions for processing to adjust a curvature of the one or more images according to the predetermined template.

16. The system of claim 13, wherein the processor is further configured to execute non-transitory computer-executable instructions for processing to adjust a height dimension and/or a width dimension of the one or more images according to the predetermined template.

* * * * *